United States Patent
Brizius

(10) Patent No.: US 9,068,120 B2
(45) Date of Patent: Jun. 30, 2015

(54) FLAME RETARDANT NYLON

(75) Inventor: Glen Leon Brizius, Atlanta, GA (US)

(73) Assignee: Empire Technology Development LLC, Wilmington, DE (US)

( * ) Notice: Subject to any disclaimer, the term of this patent is extended or adjusted under 35 U.S.C. 154(b) by 95 days.

(21) Appl. No.: 13/822,221

(22) PCT Filed: Aug. 9, 2012

(86) PCT No.: PCT/US2012/050150
§ 371 (c)(1),
(2), (4) Date: Mar. 11, 2013

(87) PCT Pub. No.: WO2014/025352
PCT Pub. Date: Feb. 13, 2014

(65) Prior Publication Data
US 2014/0045991 A1   Feb. 13, 2014

(51) Int. Cl.
  C08L 51/00 (2006.01)
  C09K 21/14 (2006.01)
  C08K 3/00 (2006.01)
(52) U.S. Cl.
  CPC .............. *C09K 21/14* (2013.01); *C08K 3/0058* (2013.01); *C08L 2666/18* (2013.01); *C08L 51/00* (2013.01)
(58) Field of Classification Search
  CPC .... C08L 2666/18; C08L 51/00; C08K 3/0058
  USPC .............................. 524/599, 600; 525/64, 418
  See application file for complete search history.

(56) References Cited

U.S. PATENT DOCUMENTS

| | | | |
|---|---|---|---|
| 2,130,523 A | 1/1935 | Carothers | |
| 2,130,947 A | 7/1936 | Carothers | |
| 2,130,948 A | 4/1937 | Carothers | |
| 4,176,225 A | 11/1979 | Sturtz et al. | |
| 4,801,639 A | 1/1989 | Hoshi et al. | |
| 5,177,132 A | 1/1993 | Takahashi et al. | |
| 5,629,432 A * | 5/1997 | Shepherd | 549/326 |
| 6,472,456 B1 | 10/2002 | Horsey et al. | |
| 7,067,076 B2 | 6/2006 | Wo et al. | |
| 2002/0096669 A1 | 7/2002 | Van Der Spek et al. | |
| 2003/0181422 A1* | 9/2003 | Haque | 514/89 |
| 2005/0107508 A1 | 5/2005 | Joo et al. | |
| 2007/0249862 A1* | 10/2007 | Nagy et al. | 562/590 |
| 2011/0257310 A1 | 10/2011 | Butz | |

FOREIGN PATENT DOCUMENTS

EP    0683209 A2    11/1995

OTHER PUBLICATIONS

USPTO structure search, Sep. 2014.*
"Brominated flame retardants in the environment," U.S. Geological Survey (USGS), Nov. 2004, pp. 1-2.
Overall Fire Statistics, retrieved from http://www.nfpa.org/categoryList.asp?categoryID=413&URL=Research/Fire%20reports/Overall%20fire%20statistics&cookie_test=1, downloaded on Feb. 25, 2013, 1 page.
Fire Safety—Flammability Statement, retrieved from http://www.pfa.org/flamm_state.html, downloaded on Feb. 25, 2013, 1 page.
US Department of Health and Human Services, Toxicological Profile for Polybrominated Biphenyls and Polybrominated Diphenyl Ethers, Agency for Toxic Substances and Diseases Registry (ATSDR), 2004.
Concerns raised about coastal levels of flame-retardant chemicals, Los Angeles Times, Apr. 2009, retrieved from http://www.latimes.com/news/local/la-me-flame-retardants1-2009apr01,0,5394842.story, downloaded on Feb. 25, 2013, 3 pages.
A. McPherson, B. Thorpe, and A. Blake, Brominated Flame Retardants in Dust on Computers: The Case for Safe Chemicals and Better Computer Design, Jun. 2004, retrieved from computertakeback.org, 43 pages.
International Search Report for application with application No. PCT/US12/50150, dated Jan. 9, 2013, 15 pages.
P. Savignac. & B. Iorga, Modern Phosphonate Chemistry, CRC Press, 2003, retrieved from http://www.crcnetbase.com/doi/pdf/10.1201/9780203503676.fmatt, 18 pages.
Kolb, H.C.; Finn, M.G.; Sharpless, K.B., Click Chemistry: Diverse Chemical Function from a Few Good Reactions Angew. Chem. Int. Ed. Engl., 2001, 40, 2004, 18 pages.
Antoni, P.; Nystrom, D.; Hawker, C.J.; Hult, A.; Malkoch, M., A chemoselective approach for the accelerated synthesis of well-defined dendritic architectures, Chem. Comm., 2007, 2249-2251.

(Continued)

*Primary Examiner* — Gregory Listvoyb
(74) *Attorney, Agent, or Firm* — Moritt Hock & Hamroff LLP; Steven S. Rubin, Esq.

(57) ABSTRACT

Technologies are generally described for a system and method effective to prepare a flame retardant. In one example, a method may include copolymerizing a mixture of monomers. The mixture of monomers may include at least one dicarboxylic acid monomer, at least one diamine monomer, and at least one monomer having the formula

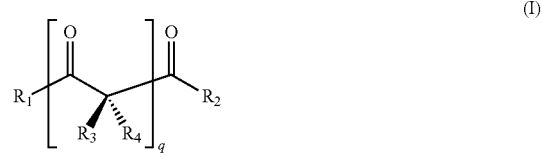

(I)

wherein R1 is hydroxyl, halogen, alkoxy, or aryloxy;
wherein R2 is hydroxyl, halogen, alkoxy, or aryloxy;
wherein R3 is H or -L-R5;
wherein R4 is H or L-R5;
wherein if R3 is H, then R4 is L-R5;
wherein L is alkyl, cycloalkyl, aryl, heteroaryl, or —(R6-O—R7)$_n$-;
wherein R6 is alkyl, cycloalkyl, aryl, or heteroaryl,
wherein R7 is alkyl, cycloalkyl, aryl, or heteroaryl,
wherein n is an integer from 1 to 12;
wherein R5 is a flame retarding moiety comprising P, N, halogen, or B; and
wherein q is an integer from 1 to 12.

22 Claims, 4 Drawing Sheets

(56) References Cited

OTHER PUBLICATIONS

Ding, J.; Tao, Z.; Fan, L.; Yang, S., Preparation and Characterization of Flame Retardant Epoxy Resins Bases on Phosphorus-Containing Biphenyl-Type Phenolic Resin, E-polymers, 2010, 122, retrieved from http://www.e-polymers.org, 13 pages.

Green, J., A Review of Phosphorus-Containing Flame Retardants, Journal of Fire Sciences 1992, 10, 19 pages.

Levchik, S. V.; Weil, E. D., A Review of Recent Progress in Phosphorus-based Flames Retardants, Journal of Fire Sciences 2006, 24, 21 pages.

Nylon Plastic, retrieved from http://www.sdplastics.com/nylon.html, downloaded on Feb. 25, 2013, 7 pages.

PTT Solution-dyed-Product Specifications, Universal Fibers, retrieved from http://www.universalfibers.net/pdf/UFS_specs_ptt.pdf, downloaded on Feb. 25, 2013, 2 pages.

Gilman, J. W. and Kashiwag, T., Nanocomposites: A Revolutionary New Flame Retardant Approach, SAMPE Journal, Aug. 1997, 7 pages, vol. 33.

* cited by examiner

300 A computer program product.

302 A signal bearing medium.

304
At least one of
One or more instructions for a method of preparing a flame retarding polymer; or
One or more instructions for copolymerizing a mixture of monomers;
wherein the mixture of monomers comprises at least one dicarboxylic acid monomer, at least one diamine monomer, and at least one monomer having the formula (I);

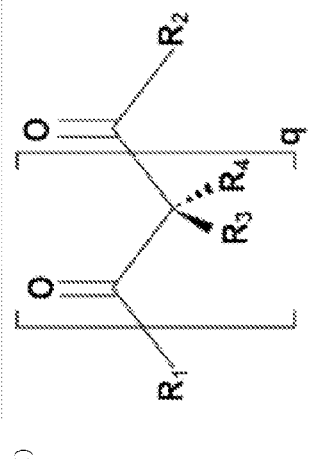

(I)

wherein R1 is hydroxyl, halogen, alkoxy, or aryloxy;
wherein R2 is hydroxyl, halogen, alkoxy, or aryloxy;
wherein R3 is H or -L-R5;
wherein R4 is H or L-R5;
wherein if R3 is H, then R4 is L-R5;
wherein L is alkyl, cycloalkyl, aryl, heteroaryl, or -(R6-O-R7)$_n$-;
wherein R6 is alkyl, cycloalkyl, aryl, or heteroaryl,
wherein R7 is alkyl, cycloalkyl, aryl, or heteroaryl,
wherein n is an integer from 1 to 12;
wherein R5 is a flame retarding moiety comprising P, N, halogen, or B; and
wherein q is an integer from 1 to 12.

306 A computer readable medium

308 A recordable medium

310 A communications medium

Fig. 3

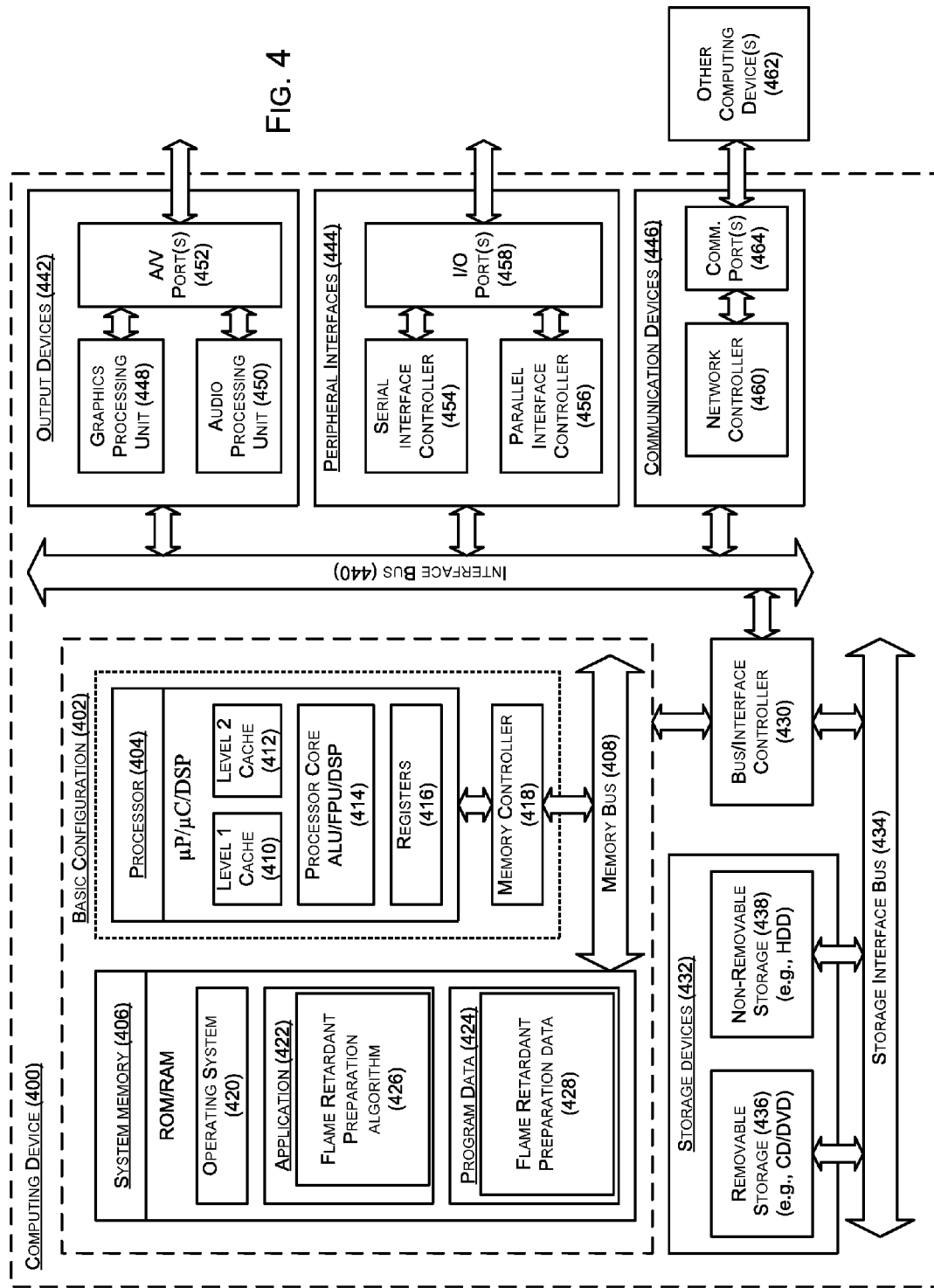

FLAME RETARDANT NYLON

CROSS REFERENCE TO RELATED APPLICATIONS

This application is a U.S. national stage filing under 35 U.S.C. §371 of International Application No. PCT/US2012/50150 filed Aug. 9, 2012, the entirety of which is hereby incorporated by reference.

BACKGROUND

Unless otherwise indicated herein, the materials described in this section are not prior art to the claims in this application and are not admitted to be prior art by inclusion in this section.

In various fields, materials may benefit from protection from fire. One approach is to coat the material with a flame retardant to protect the material from fire. The flame-retarded material can thus be more resistant to a flame than a material that has not been coated with a flame retardant.

SUMMARY

In an example, a compound is generally described. The compound may have the formula (I)

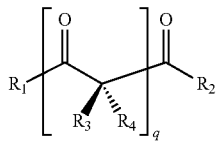

(I)

wherein R1 may be hydroxyl, halogen, alkoxy, or aryloxy;
wherein R2 may be hydroxyl, halogen, alkoxy, or aryloxy;
wherein R3 may be H or -L-R5;
wherein R4 may be H or L-R5;
wherein if R3 is H, then R4 may be L-R5;
wherein L may be alkyl, cycloalkyl, aryl, heteroaryl, or —(R6-O—R7)$_n$-;
wherein R6 may be alkyl, cycloalkyl, aryl, or heteroaryl,
wherein R7 may be alkyl, cycloalkyl, aryl, or heteroaryl,
wherein n may be an integer from 1 to 12;
wherein R5 may be a flame retarding moiety comprising P, N, halogen, or B; and
wherein q may be an integer from 1 to 12.

In an example, a flame retarding polymer reaction product of at least one monomer is generally described. The monomer may have the formula (I),

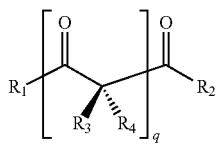

(I)

wherein R1 may be hydroxyl, halogen, alkoxy, or aryloxy;
wherein R2 may be hydroxyl, halogen, alkoxy, or aryloxy;
wherein R3 may be H or -L-R5;
wherein R4 may be H or L-R5;
wherein if R3 is H, then R4 may be L-R5;
wherein L may be alkyl, cycloalkyl, aryl, heteroaryl, or —(R6-O—R7)$_n$-;
wherein R6 may be alkyl, cycloalkyl, aryl, or heteroaryl,
wherein R7 may be alkyl, cycloalkyl, aryl, or heteroaryl,
wherein n may be an integer from 1 to 12;
wherein R5 may be a flame retarding moiety comprising P, N, halogen, or B; and
wherein q may be an integer from 1 to 12.

In one example, a method of preparing a flame retarding polymer is generally described. The method may include copolymerizing a mixture of monomers. The mixture of monomers may include at least one dicarboxylic acid monomer, at least one diamine monomer, and at least one monomer having the formula (I);

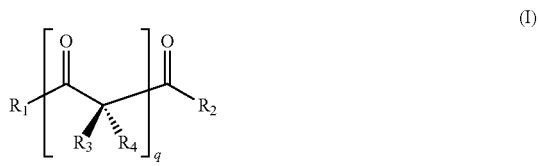

(I)

wherein R1 may be hydroxyl, halogen, alkoxy, or aryloxy;
wherein R2 may be hydroxyl, halogen, alkoxy, or aryloxy;
wherein R3 may be H or -L-R5;
wherein R4 may be H or L-R5;
wherein if R3 is H, then R4 may be L-R5;
wherein L may be alkyl, cycloalkyl, aryl, heteroaryl, or —(R6-O—R7)$_n$-;
wherein R6 may be alkyl, cycloalkyl, aryl, or heteroaryl,
wherein R7 may be alkyl, cycloalkyl, aryl, or heteroaryl,
wherein n may be an integer from 1 to 12;
wherein R5 may be a flame retarding moiety comprising P, N, halogen, or B; and
wherein q may be an integer from 1 to 12.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 3 illustrates a computer program product that can be used to implement the preparation of a flame retardant and a flame retardant nylon; and FIG. 4 is a block diagram illustrating an example computing device that is arranged to implement the preparation of a flame retardant and a flame retardant nylon;

Figure 1:
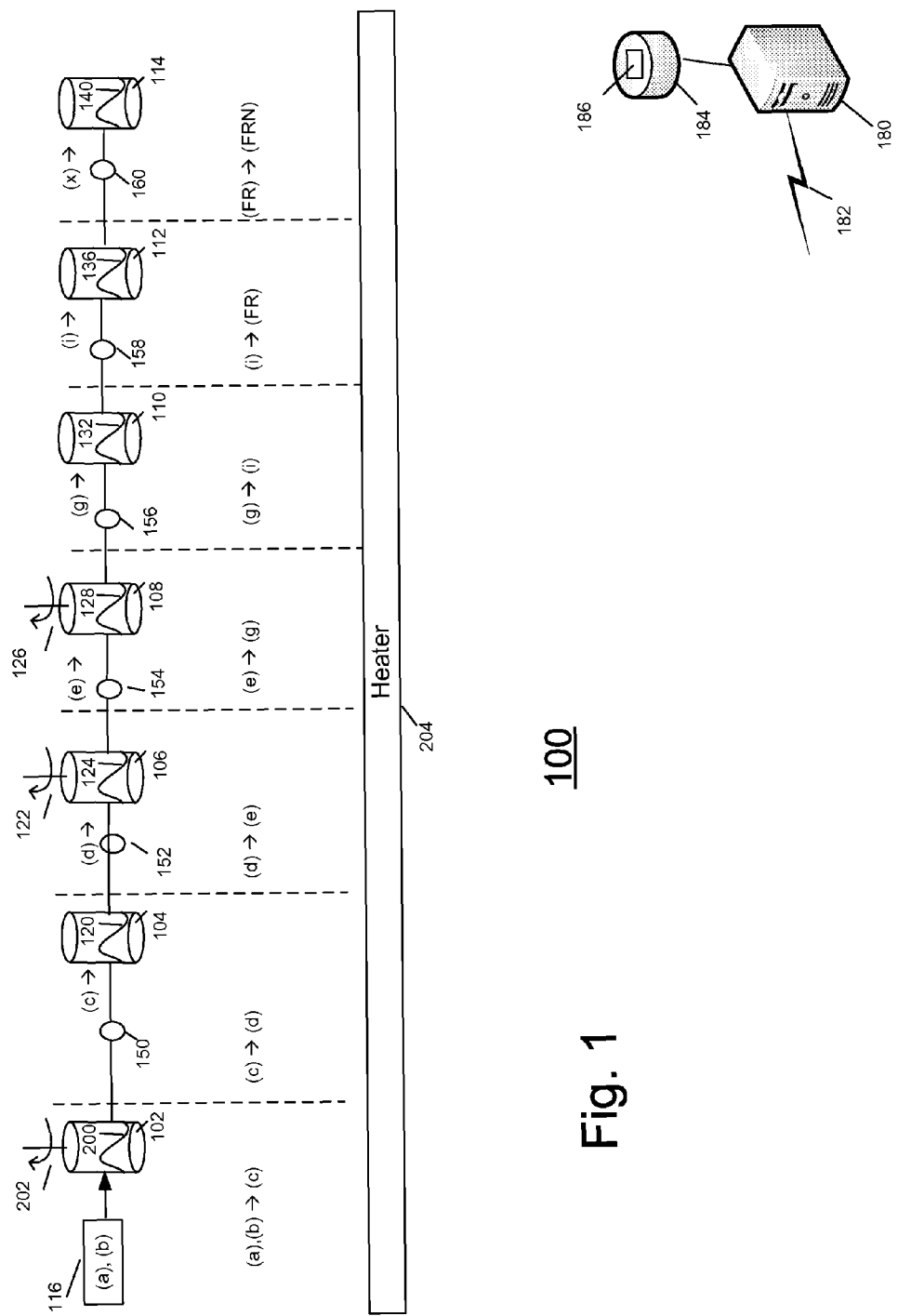
FIG. 1 illustrates an example system that can be used to prepare a flame retardant nylon.

all arranged according to at least some embodiments described herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, among other things, to systems, methods, materials and apparatus related to preparing a flame retardant nylon.

Briefly stated, technologies are generally described for a system and method effective to make a flame retardant. In one example, a method may include copolymerizing a mixture of monomers. The mixture of monomers may include at least one dicarboxylic acid monomer, at least one diamine monomer, and at least one monomer having the formula (I);

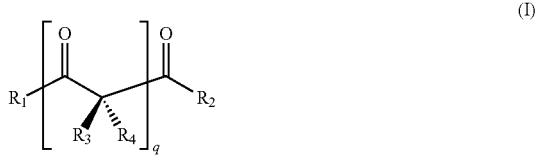

(I)

wherein R1 may be hydroxyl, halogen, alkoxy, or aryloxy;
wherein R2 may be hydroxyl, halogen, alkoxy, or aryloxy;
wherein R3 may be H or -L-R5;
wherein R4 may be H or L-R5;
wherein if R3 is H, then R4 may be L-R5;
wherein L may be alkyl, cycloalkyl, aryl, heteroaryl, or —(R6-O—R7)$_n$-;
wherein R6 may be alkyl, cycloalkyl, aryl, or heteroaryl,
wherein R7 may be alkyl, cycloalkyl, aryl, or heteroaryl,
wherein n may be an integer from 1 to 12;
wherein R5 may be a flame retarding moiety comprising P, N, halogen, or B; and
wherein q may be an integer from 1 to 12.

It will also be understood that any compound, material or substance which is expressly or implicitly disclosed in the specification or recited in a claim as belonging to a group or structurally, compositionally or functionally related compounds, materials or substances, includes individual representatives of the group and all combinations thereof.

FIG. 1 illustrates an example system that may be used to prepare a flame retardant nylon in accordance with at least some embodiments described herein. An example system 100 effective to prepare a flame retardant nylon may include a first container 102, a second container 104, a third container 106, a fourth container 108, a fifth container 110, a sixth container 112, a seventh container 114, and a heater 204 arranged in operative relationship. At least some of these elements may be arranged in communication with a processor 180 through a communication link 182. In some examples, processor 180 may be adapted in communication with a memory 184 that may include instructions 186 stored therein. Processor 180 may be configured, such as by instructions 186, to control at least some of the operations/actions/functions described below.

First container 102 may include a first reaction mixture 116 which includes a compound of the general formula (a); and, an alkanol of the general formula (b). First container 102 may in some examples further include reaction materials 200.

Reaction materials 200 may include one or more of an aqueous base having a pKa of at least about 11, an organic solvent, and a phase transfer catalyst.

First container 102 may be effective to receive and react, by hand or machine, the compound of the general formula (a) with an alkanol of the general formula (b) and reaction materials 200 to produce a compound of the general formula (c). A stirring device 202 may be used to stir the combination of first reaction mixture 116 with reaction materials 200 rapidly, so that the organic and aqueous layers are intimately mixed, for a time interval of about 4 hours to about 30 hours at a temperature of about 0 degrees Celsius to about 50 degrees Celsius.

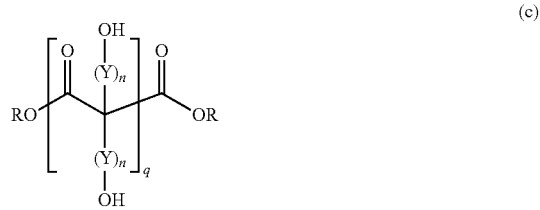

In some examples, compound of the general formula (a) may be such that q is 1 to about 20, 1 to about 8, 1 to about 4, or 1 or 2. In some examples, R in formula (a) may be an alkyl including from 1 to about 4 carbon atoms, and more specifically methyl, ethyl, propyl, isopropyl, or butyl.

In some examples, an alkanol of the general formula (b) may be such that X is a halogen. X may be a leaving group suitable for displacement in an $S_N2$ reaction. In some further examples, alkanol of the general formula (b) may be such that Y is a divalent alkylene group containing from 2 to about 24 carbon atoms, specifically from 2 to about 4 carbon atoms, most specifically, 3 carbon atoms, such as the non-limiting examples of ethylene and propylene. As such, in some examples, n may be 2 to about 24, 2 to about 12, 2 to about 6, or 3. In one non-limiting embodiment, alkanol (b) may be 3-bromo-1-propanol.

In an example, alkanol of the general formula (b) may be present in a molar ratio of at least 4 equivalents to one equivalent of compound of the general formula (a). In some examples, the amount of compound of general formula (a) to the amount of alkanol of general formula (b) may be about 1:2 to about 1:6 molar equivalents, or 1 equivalent of compound of general formula (a) to 4 equivalents of alkanol of general formula (b), i.e., 1:4.

In some examples, an aqueous base in reaction materials 200 may include a pKa of at least about 11. The aqueous base may be at least one of NaOH(aq), KOH(aq), LiOH(aq), $K_2CO_3$, $Na_2CO_3$ and the like.

In some further examples, the organic solvent in reaction materials 200 may be at least one water-insoluble organic solvent such as the non-limiting examples of dichloromethane, tetrahydrofuran, dimethylformamide, dimethylsulfoxide, and isomers of dichlorobenzene, xylene, chlorobenzene and toluene.

In some examples, the phase transfer catalyst in reaction materials 200 may be a quaternary ammonium salt, such as the non-limiting examples of benzyltrimethylammonium chloride tetraethylammoniumchloride, dibenzyldidodecylammonium chloride, toluoyltrimethylammonium chloride, or phenyltrioctyl ammonium chloride. In some examples, compound of the general formula (c) may be a reaction product of compound of the general formula (a), the alkanol of the general formula (b) and the organic solvent. As such, R and q in compound of the general formula (c) may have the same definition as provided above for formula (a). Further, in some examples Y and n may have the same value as indicated above for alkanol of the general formula (b).

Reaction materials 200 may include a solution including 5 wt. % to about 50 wt. % sodium hydroxide, potassium carbonate, or sodium carbonate Reaction materials 200 may include about a solution including 5 wt. % to about 50 wt. % with a tetraethylammoniumchloride phase transfer catalyst. Reaction materials 200 may include an organic solvent which may be at least one of dichloromethane or chlorobenzene.

In some examples, second container 104 may be in operative relationship with first container 102 through, for example, a valve 150. Valve 150 may be configured, such as by control of processor 180, to control a flow of the contents of first container 102 into second container 104. Compound of the general formula (c) may be provided to second container 104.

In some examples, second container 104 may include reaction materials 120. Reaction materials 120 may react with compound of the general formula (c) to produce a compound of the general formula (d) by, for example, an $S_N2$ reaction. Compound of the general formula (d) may have the same definitions of R, Y, n and q as defined above.

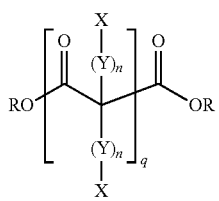

(d)

Reaction materials 120 may include $PBr_3$ or tosyl chloride. In some examples in second container 104, $PBr_3$ may be present in ether. In some examples, in reaction materials 120, tosyl chloride may be present in pyridine. Other reactions may be implemented to transform terminal hydroxyls into leaving groups. Second container 104 may be effective to receive and react by hand or machine compound of the general formula (c) and $PBr_3$ or tosyl chloride to produce compound of the general formula (d).

In some examples, sufficient reaction conditions in second container 104 may include reflux when $PBr_3$ in ether is used. In some examples, sufficient reaction conditions may include a temperature of about 15 degrees Celsius to about 25 degrees Celsius when tosyl chloride is used. In some examples, the amount of compound of general formula (c) to tosyl chloride may be of from about 1:2 to about 1:6 molar equivalents, specifically 1 equivalent of compound of general formula (c) to 4 equivalents of tosyl chloride, i.e., 1:4.

In some examples, third container 106 may be in operative relationship with second container 104 through, for example, a valve 152. Valve 152 may be configured, such as by control of processor 180, to control a flow of the contents of second container 104 into third container 106.

In some examples, third container 106 may include reaction materials 124. Reaction materials 124 may include at least one of $NaN_3$ or $KN_3$. In some further examples, reaction materials 124 may include at least one of $NaN_3$ or $KN_3$ which may be present in tetrahydrofuran (THF) or present in ether in water. In other examples, a Group I metal azide may be used. Third container 106 may be effective to receive and react by hand or machine, compound of the general formula (d) and reaction materials 124 to produce compound of the general formula (e).

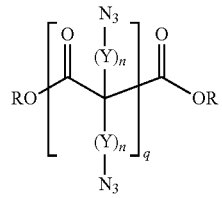

(e)

In some examples, compound of the general formula (e) may have the same definitions of R, Y, n and q as defined above.

In some examples, reaction of a compound of the general formula (d) with reaction materials 124 may be performed at a molar ratio of at least four equivalents of $NaN_3$ or $KN_3$ to one equivalent of a compound of the general formula (d).

In some examples, such reaction in third container 106 may be conducted under sufficient reaction conditions. In some examples, sufficient reaction conditions in third container 106 may include stirring reaction materials 124 with compound of the general formula (d) such as by using a stirring device 122, in a temperature of about 0 degrees Celsius to about 50 degrees Celsius.

In some examples, fourth container 108 may be in operative relationship with third container 106 through, for example, a valve 154. Valve 154 may be configured, such as by control of processor 180, to control a flow of the contents of third container 106 into fourth container 108.

In some examples, fourth container 108 may include reaction materials 128. Reaction materials 128 may include a compound of the general formula (f). In some examples, reaction materials 128 may further include a copper salt catalyst.

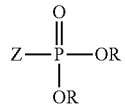

(f)

where Z is an organic moiety including up to 30 carbon atoms and an alkynyl moiety.

In some further examples the compound of the general formula (f) may be selected from the group consisting of:

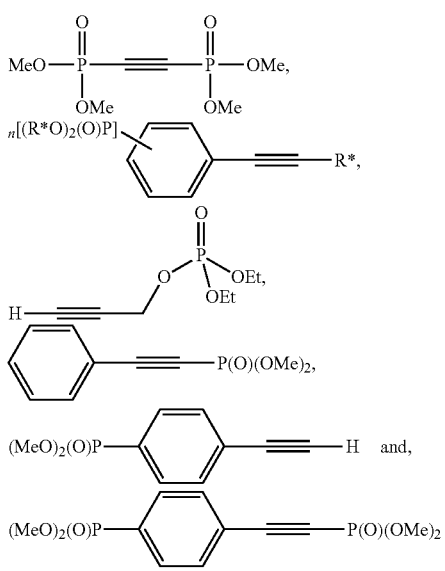

and, where R* is one of H, an alkyl of up to about 24 [carbon atoms or an aryl of from about 6 to about 12 carbon atoms; and, n is an integer of about 1 to about 5.

Fourth container 108 may be effective to receive and react by hand or machine compound of the general formula (e) and reaction materials 128 to produce compound of the general formula (g). Compound of the general formula (g) may have the same definitions of R, Y, n and q as defined above.

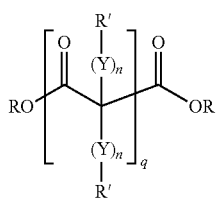
(g)

In some examples, R' may be

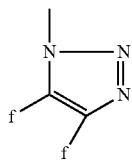

In some examples, reaction of the compound of the general formula (e) with reaction materials 128 further includes reaction of (e) with (f) at a molar ratio of at least four equivalents of compound of the general formula (f) to one equivalent of compound of general formula (e) and where the copper salt catalyst is a copper II salt catalyst.

In some examples, the copper salt catalyst may be a copper I sulfate, and reaction of the compound of the general formula (e) with reaction materials 128 may include reaction of (e) with (f) at a molar ratio of at least four equivalents of compound of the general formula (f) to one equivalent of compound of general formula (e); and, reaction of the copper II sulfate with vitamin C to produce copper I sulfate.

In some examples, sufficient reaction conditions in fourth container 108 may include stirring reaction materials 128, such as with a stirring device 126, to react with compound of the general formula (e) at a temperature of from about 20° C. to about 60° C.

In some examples, fifth container 110 may be in operative relationship with fourth container 108 through, for example, a valve 156. Valve 156 may be configured, such as by control of processor 180, to control a flow of the contents of fourth container 108 into fifth container 110.

In some examples, fifth container 110 may include reaction materials 132. Reaction materials 132 may include an aqueous alkaline solution. Fifth container 110 may be effective to receive and react by hand or machine compound of the general formula (g) and reaction materials 132 to produce compound of the general formula (i).

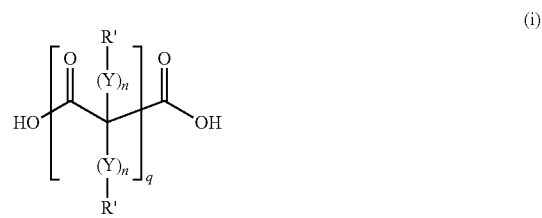
(i)

In some examples, compound of the general formula (i) may have the same definitions of Y, n and q as defined above. Further, R' in general formula (i) may be as defined above for compound of the general formula (g).

In some examples, sufficient reaction conditions in fifth container 110 may include allowing reaction materials 128 to react with compound of the general formula (g) for a time interval of from about 1 hour to about 4 hours and at a temperature of about 50° C. to about reflux.

In some examples, sixth container 112 may be in operative relationship with fifth container 110 through, for example, a valve 158. Valve 158 may be configured, such as by control of processor 180, to control a flow of the contents of fifth container 110 into sixth container 112.

In some examples, sixth container 112 may include reaction materials 136. Reaction materials 136 may include at least one of thionyl chloride, oxalyl chloride or phosgene. Sixth container 112 may be effective to receive and react by hand or machine compound of the general formula (i) and reaction materials 136 to produce flame retardant of the general formula (FR).

In some examples, flame retardant of the general formula (FR), may have the same definitions of Y, n and q as defined above. Further, R' in flame retardant of the general formula (FR) may be as defined above for compound of the general formula (g).

In some examples, sufficient reaction conditions in sixth container 112 may include allowing reaction materials 136 to react with compound of the general formula (i) for a time interval of from about 1 hour to about 4 hours and at a temperature of from about 18° C. to about reflux.

In some examples, seventh container 114 may be in operative relationship with sixth container 112 through, for example, a valve 160. Valve 160 may be configured, such as by control of processor 180, to control a flow of the contents of sixth container 112 into seventh container 114.

In some further examples, seventh container 114 may include reaction materials 140. Reaction materials 140 may include the materials of a polycondensation nylon synthesis reaction. Seventh container 114 may be effective to receive and react by hand or machine, flame retardant of the general formula (FR) and, reaction materials 140 to produce a flame retarded nylon (FRN).

In some examples, reaction materials 140 may include an α,ω-alkanediamine, such as a 1,6-hexanediamine. In some other examples, the materials of the polycondensation nylon synthesis reaction further include a dicarboxylic acid, such as the non-limiting examples of hexanedioic acid and other α,ω-alkanediacids. Other groups such as aryls, cycloalkanes, and fused aryls of varying sizes and configurations may also be used with two terminal acid groups and two terminal amine groups.

Among other potential benefits, a system in accordance with the disclosure may be used to produce a flame retardant. The reaction may be relatively high yielding and may produce little by-products, making the process an attractive "green" process. The flame retardant may be multifunctional and so only a small amount is needed in order to provide excellent protection against fire/flame. The flame retardant may be innocuously "locked" onto/into the nylon polymer backbone, where the flame retardant may continue to provide flame retardancy over the lifetime of the material. The finished material may be difficult to break into smaller fragments during basic/acid hydrolysis.

Figure 2:
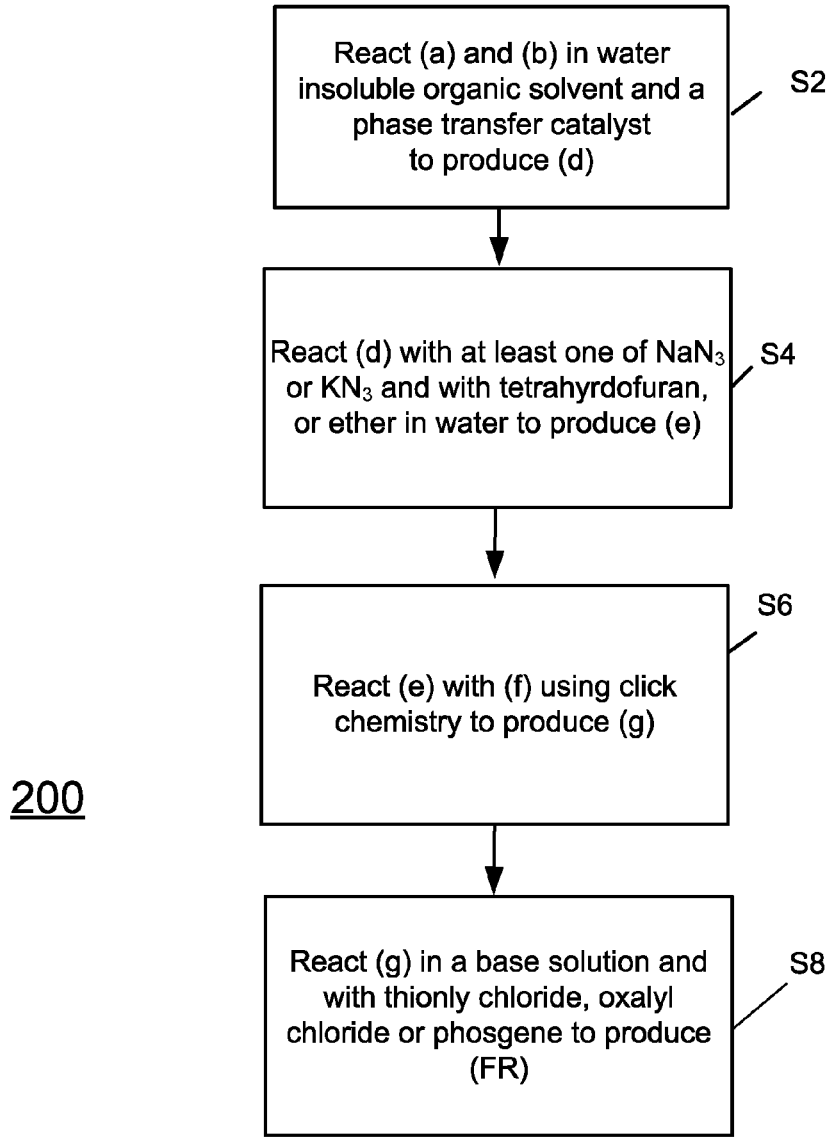
FIG. 2 depicts a flow diagram for an example method to prepare a flame retardant and a flame retardant nylon.
Figure 1:
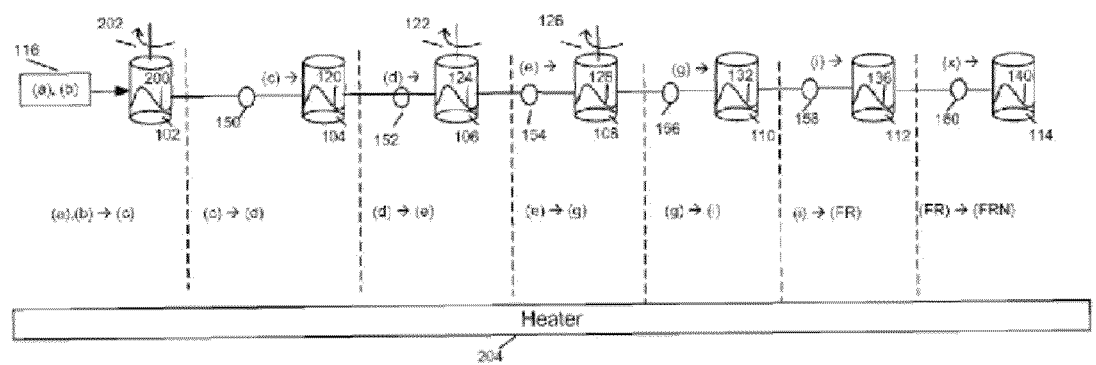
Figure 1:
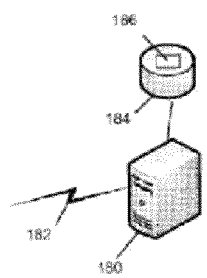

FIG. 2 depicts a flow diagram for an example method to prepare a flame retardant and a flame retardant nylon in accordance with at least some embodiments described herein. The process in FIG. 2 could be implemented using, for example, system 100 discussed above. An example process may include one or more operations, actions, or functions as illustrated by one or more of blocks S2, S4, S6, or S8. Although illustrated as discrete blocks, various blocks may be divided into additional blocks, combined into fewer blocks, or eliminated, depending on the desired implementation.

Process 200 may begin at block S2, "React (a) and (b) in water insoluble organic solvent and a phase transfer catalyst to produce (d)." At block S2, compound of the general formula (a) and alkanol of the general formula (b) may be placed in a container such as by hand or through a machine under control of a processor. The container may have aqueous base, organic solvent and phase transfer catalyst present. A compound of the general formula (d) may be produced.

Processing may continue from block S2 to block S4, "React (d) with at least one of $NaN_3$ or $KN_3$ and with tetrahyrdofuran, or ether in water to produce (e)." At block S6, the processor may be configured to control a flow of the compound of the general formula (d) and at least one of $NaN_3$ or $KN_3$ to a container with THF or ether in water to produce (e).

Processing may continue from block S4 to block S6, "React (e) with (f) using click chemistry to produce (g)." At block S8, a compound of the general formula (e) and compound of the general formula (f) in may be placed in contact with one another such as by hand or by machine under control of a processor to produce a compound of the general formula (g).

Processing may continue from block S6 to block S8, "React (g) in a base solution and with thionyl chloride, oxalyl chloride or phosgene to produce (FR)." At block S8, a compound of the general formula (g) and an aqueous alkaline solution and at least one of thionyl chloride, oxalyl chloride or phosgene may be placed in contact with one another such as by hand or by machine under control of a processor to produce a flame retardant (FR).

Example 1

In some examples, the compound of the general formula (a) may be

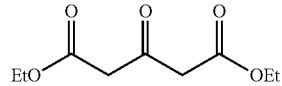

The alkanol of the general formula (b) may be 3-bromo-1-propanol. The aqueous base may be NaOH(aq). The organic solvent may be $CH_2Cl_2$. The phase transfer catalyst may be benzyltrimethylammonium chloride. The reaction of compound of general formula (c) may be performed with $PBr_3$ in ether at reflux. The reaction of the compound of the general formula (d) may be performed with $NaN_3$. The compound of the general formula (f) may be:

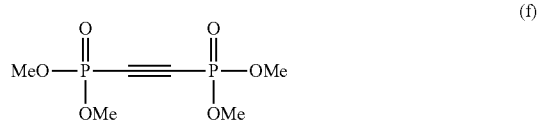

(f)

The copper salt catalyst may be a copper II sulfate which may be first reacted with vitamin C to produce a copper I sulfate as the copper catalyst which is present in the reaction of (e) and (f). The aqueous alkaline solution may be NaOH(aq).

Example 2

In an example, a method of producing a flame retardant may include contacting a compound of the general formula (a) with an alkanol of the general formula (b) and with an aqueous base having a pKa of at least about 11, an organic solvent, and a phase transfer catalyst, to produce a compound of the general formula (c), where (a) is of the general formula:

(a)

where R is an alkyl of from 1 to about 12 carbon atoms, a benzyl group of from 7 to about 12 carbon atoms, or an aryl group of from 6 to about 12 carbon atoms, and q is an integer number equal to at least 1,

$X(Y)_n OH$ (b)

wherein X is a leaving group suitable for displacement in an $S_n 2$ reaction and Y is either $CH_2$ or $—OC_2H_4—$, where n is an integer of from about 2 to about 24 and (c) is of the general formula:

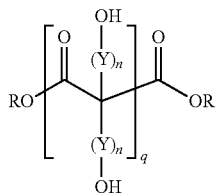
(c)

and the method further includes contacting a compound of the general formula (c) with a reactant which can transform the hydroxide of formula (c) into a leaving group X of formula (d), which X is as defined above, which reactant is present in an amine base to produce a compound of the general formula (d):

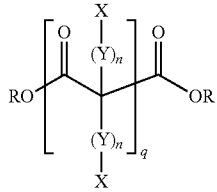
(d)

and the method further includes contacting a compound of the general formula (d) with at least one of $NaN_3$ or $KN_3$, and with water and at least one cosolvent selected from the group consisting of:
tetrahydrofuran,
ether,
an alkanol containing from 1 to about 12 carbon atoms,
to produce a compound of the general formula (e):

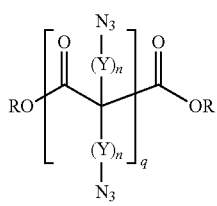
(e)

and the method further includes contacting a compound of the general formula (e) with a compound of the general formula (f) to produce a compound of the general formula (g) wherein (f) is of the general formula:

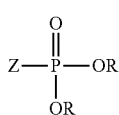
(f)

wherein Z is an organic moiety including up to 30 carbon atoms and an alkynyl moiety, and contacting of compound (e) and compound (f) is performed with a copper salt catalyst, and (g) is of the general formula:

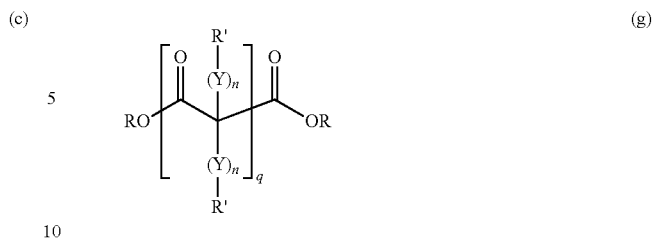
(g)

where each R' is a univalent moiety of the general formula (h):

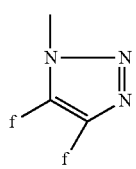
(h)

and the method further includes contacting a compound of the general formula (g) in an aqueous alkaline solution to produce a compound of the general formula (h):

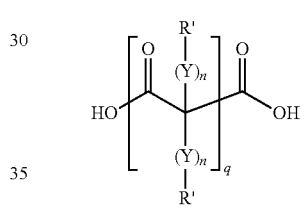
(h)

and the method further includes contacting a compound of the general formula (h) with at least one of thionyl chloride, oxalyl chloride, phosgene, $PCl_3$, $PCl_5$, $CCl_4/PPh_3$, $Cl_2CHOMe$, and $ClCH_2CCl_2OEt$ to produce a flame retardant of the general formula (FR):

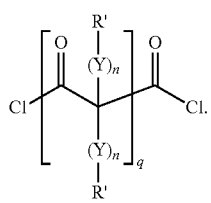
(FR)

In some examples, the method further includes contacting (a) and (b) with about a 5 wt. % to about 50 wt. % solution of at least one of sodium hydroxide, potassium carbonate, sodium carbonate, or sodium bicarbonate, and with a quaternary ammonium salt. The organic solvent may be at least one of dichloromethane, toluene, benzene, or chlorobenzene. The alkanol of the general formula (b) may be present in a molar ratio of at least 4 equivalents to one equivalent of a compound of the general formula (a).

In some examples, contacting a compound of the general formula (d) with at least one of $NaN_3$ or $KN_3$, is performed at a molar ratio of at least four equivalents of $NaN_3$ and/or $KN_3$ to one equivalent of a compound of the general formula (d).

In some examples, the compound of the general formula (f) is selected from the group consisting of:

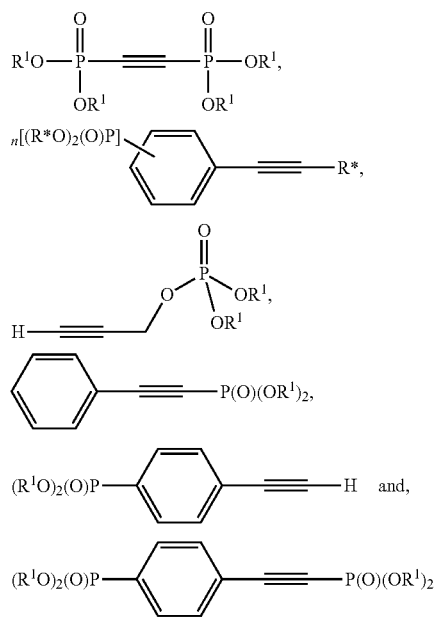

where

R* is one of H, an alkyl of up to about 18 carbon atoms, or an aryl of from 6 to about 12 carbon atoms, R¹ is an alkyl of up to about 18 carbon atoms; and n is an integer of from 1 to 5.

In some examples, contacting the compound of the general formula (e) with the compound of the general formula (f) further comprises contacting (e) with (f) at a molar ratio of at least four equivalents of compound of the general formula (f) to one equivalent of compound of general formula (e). The copper salt catalyst may be a copper II catalyst. Contacting of (e) and (f) my further include a reducing agent.

In some examples, the copper salt catalyst is a copper I sulfate. Contacting the compound of the general formula (e) with the compound of the general formula (f) further comprises contacting (e) with (f) at a molar ratio of at least four equivalents of compound of the general formula (f) to one equivalent of compound of general formula (e). The method may further include contacting a copper II sulfate with vitamin C to produce the copper I sulfate.

In some examples, contacting the compound of the general formula (e) with the compound of the general formula (f) further comprises contacting (e) with (f) at a molar ratio of at least four equivalents of compound of the general formula (f) to one equivalent of compound of general formula (e). The copper salt catalyst may be a copper I sulfate.

In some examples, contacting of the compound of the general formula (c) with a reactant can transform the hydroxide of formula (c) into a leaving group X of formula (d) is such that the reactant is tosyl chloride and the amine base is pyridine and the contacting is performed at a temperature of at least −78 degrees Celsius.

In some examples, the phase transfer catalyst is a quaternary ammonium salt.

In some examples, the compound of the general formula (a) is

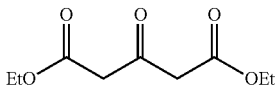

where the alkanol of the general formula (b) is 3-bromo-1-propanol, the aqueous base is NaOH(aq), the organic solvent is $CH_2Cl_2$, the phase transfer catalyst is benzyltrimethylammonium chloride, the contacting of compound of general formula (c) with the reactant which can transform the hydroxide of formula (c) into a leaving group X of formula (d) is such that the reactant is $PBr_3$ in ether at reflux, the contacting of the compound of the general formula (d) is performed with $NaN_3$, the compound of the general formula (f) is:

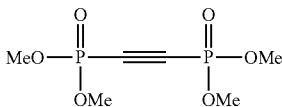

where the copper salt catalyst is a copper II sulfate which is first contacted with vitamin C to produce a copper I sulfate as the copper salt catalyst which is present in the contacting of (e) and (f), and the aqueous alkaline solution is NaOH(aq).

The produced flame resistant nylon monomer may be mixed in a 6,6 nylon synthesis reaction with appropriate stoichiometry to produce a flame resistant ripstop nylon.

FIG. 3 illustrates a computer program product that can be used to implement the preparation of a flame retardant and a flame retardant nylon in accordance with at least some embodiments described herein. Program product 300 may include a signal bearing medium 302. Signal bearing medium 302 may include one or more instructions 304 that, when executed by, for example, a processor, may provide the functionality described above with respect to FIGS. 1-2. Thus, for example, referring to system 100, processor 180 may undertake one or more of the blocks shown in FIG. 3 in response to instructions 304 conveyed to the system 100 by medium 302.

In some implementations, signal bearing medium 302 may encompass a computer-readable medium 306, such as, but not limited to, a hard disk drive, a Compact Disc (CD), a Digital Video Disk (DVD), a digital tape, memory, etc. In some implementations, signal bearing medium 302 may encompass a recordable medium 308, such as, but not limited to, memory, read/write (R/W) CDs, R/W DVDs, etc. In some implementations, signal bearing medium 302 may encompass a communications medium 310, such as, but not limited to, a digital and/or an analog communication medium (e.g., a fiber optic cable, a waveguide, a wired communications link, a wireless communication link, etc.). Thus, for example, program product 300 may be conveyed to one or more modules of the system 100 by an RF signal bearing medium 302, where the signal bearing medium 302 is conveyed by a wireless communications medium 310 (e.g., a wireless communications medium conforming with the IEEE 802.11 standard).

FIG. 4 is a block diagram illustrating an example computing device that is arranged to implement the preparation of a flame retardant and a flame retardant nylon according to at least some embodiments described herein. In a very basic configuration 402, computing device 400 typically includes one or more processors 404 and a system memory 406. A memory bus 408 may be used for communicating between processor 404 and system memory 406.

Depending on the desired configuration, processor 404 may be of any type including but not limited to a microprocessor (µP), a microcontroller (µC), a digital signal processor (DSP), or any combination thereof. Processor 404 may include one more levels of caching, such as a level one cache 410 and a level two cache 412, a processor core 414, and registers 416. An example processor core 414 may include an arithmetic logic unit (ALU), a floating point unit (FPU), a digital signal processing core (DSP Core), or any combination thereof. An example memory controller 418 may also be used with processor 404, or in some implementations memory controller 418 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more applications 422, and program data 424. Application 422 may include a flame retardant preparation algorithm 426 that is arranged to perform the various functions/actions/operations as described herein including at least those described with respect to system 100 of FIGS. 1-3. Program data 424 may include flame retardant preparation data 428 that may be useful for implementing preparation of a flame retardant nylon as is described herein. In some embodiments, application 422 may be arranged to operate with program data 424 on operating system 420 such that preparation of a flame retardant nylon may be provided. This described basic configuration 402 is illustrated in FIG. 4 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (e.g., output devices 442, peripheral interfaces 444, and communication devices 446) to basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application.

The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A compound having the formula (I),

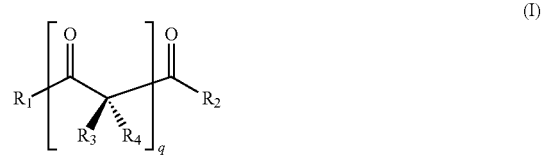

wherein R1 is hydroxyl, halogen, alkoxy, or aryloxy;
wherein R2 is hydroxyl, halogen, alkoxy, or aryloxy;
wherein R3 is H or -L-R5;
wherein R4 is H or L-R5;
wherein if R3 is H, then R4 is L-R5;
wherein L is alkyl, cycloalkyl, aryl, heteroaryl, or —(R6-O—R7)$_n$-;
wherein R6 is alkyl, cycloalkyl, aryl, or heteroaryl,
wherein R7 is alkyl, cycloalkyl, aryl, or heteroaryl,
wherein n is an integer from 1 to 12;
wherein R5 is a flame retarding moiety comprising P, N, halogen, or B; and
wherein q is an integer from 2 to 12.

2. The compound of claim 1, wherein R1 is Cl and R2 is Cl.

3. The compound of claim 1, wherein R1 is hydroxyl and R2 is hydroxyl.

4. The compound of claim 1, wherein R1 is alkoxy and R2 is alkoxy.

5. The compound of claim 1, wherein R1 and R2 are the same.

6. The compound of claim 1, wherein R1 and R2 are different.

7. The compound of claim 1, where R3 is L-R5 and R4 is L-R5.

8. The compound of claim 1, wherein L is propyl.

9. The compound of claim 1, wherein R5 comprises at least one phosphonate group.

10. The compound of claim 1, wherein R5 comprises at least two phosphonate groups.

11. The compound of claim 1, wherein R5 comprises at least one phosphinate group.

12. The compound of claim 1, wherein R5 comprises at least one boron atom.

13. The compound of claim 1, wherein L is alkyl; wherein R5 is:

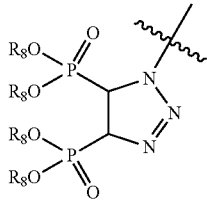

(II)

wherein R8 is alkyl.

14. The compound of claim 1, wherein L is alkyl; and wherein R5 is:

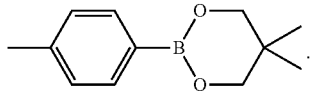

(III)

15. A flame retarding polymer reaction product of at least one monomer, wherein the monomer has the formula (I),

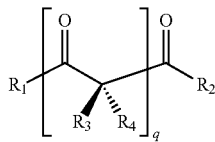

(I)

wherein R1 is hydroxyl, halogen, alkoxy, or aryloxy;
wherein R2 is hydroxyl, halogen, alkoxy, or aryloxy;
wherein R3 is H or -L-R5;
wherein R4 is H or L-R5;
wherein if R3 is H, then R4 is L-R5;
wherein L is alkyl, cycloalkyl, aryl, heteroaryl, or —(R6-O—R7)$_n$-;
wherein R6 is alkyl, cycloalkyl, aryl, or heteroaryl,
wherein R7 is alkyl, cycloalkyl, aryl, or heteroaryl,
wherein n is an integer from 1 to 12;
wherein R5 is a flame retarding moiety comprising P, N, halogen, or B; and
wherein q is an integer from 1 to 12.

16. The flame retarding polymer of claim 15, wherein the polymer is a polyamide, polyimide, or polyester.

17. The flame retarding polymer of claim 15, wherein the polymer is a nylon.

18. The flame retarding polymer of claim 15, wherein the monomer having the formula (I) is present in the polymer at a weight percentage of about 0.1% to about 10%.

19. A method of preparing a flame retarding polymer, the method comprising copolymerizing a mixture of monomers;
    wherein the mixture of monomers comprises at least one dicarboxylic acid monomer, at least one diamine monomer, and at least one monomer having the formula (I);

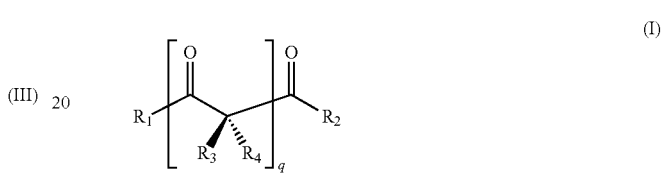

(I)

wherein R1 is hydroxyl, halogen, alkoxy, or aryloxy;
wherein R2 is hydroxyl, halogen, alkoxy, or aryloxy;
wherein R3 is H or -L-R5;
wherein R4 is H or L-R5;
wherein if R3 is H, then R4 is L-R5;
wherein L is alkyl, cycloalkyl, aryl, heteroaryl, or —(R6-O—R7)$_n$-;
wherein R6 is alkyl, cycloalkyl, aryl, or heteroaryl,
wherein R7 is alkyl, cycloalkyl, aryl, or heteroaryl,
wherein n is an integer from 1 to 12;
wherein R5 is a flame retarding moiety comprising P, N, halogen, or B; and
wherein q is an integer from 1 to 12.

20. The method of claim 19, wherein the monomer having the formula (I) is present in the mixture of monomers at about 0.1% by weight to about 10% by weight.

21. The method of claim 19, wherein the dicarboxylic acid monomer is adipic acid, sebacic acid, terephthalic acid, isophthalic acid, or combinations thereof.

22. The method of claim 19, wherein the diamine monomer is hexamethylene diamine or pentamethylene diamine.

* * * * *

UNITED STATES PATENT AND TRADEMARK OFFICE
CERTIFICATE OF CORRECTION

PATENT NO.        : 9,068,120 B2
APPLICATION NO.   : 13/822221
DATED             : June 30, 2015
INVENTOR(S)       : Brizius It is certified that error appears in the above-identified patent and that said Letters Patent is hereby corrected as shown below:

In the Drawings

Delete drawing sheet 1 of 4 and replace with new drawing sheet 1 of 4. (attached)

In the Specification

Column 1, Line 7, delete "§371" and insert -- § 371 --, therefor.

Signed and Sealed this
Tenth Day of May, 2016

Michelle K. Lee
*Director of the United States Patent and Trademark Office*